Sept. 28, 1965 G. L. DUPOUY ETAL 3,209,147
ELECTRON LENS SPHERICAL ABERRATION CORRECTING DEVICE
COMPRISING A CURRENT CARRYING WIRE
SECTION ON THE LENS AXIS
Filed March 5, 1963
3 Sheets-Sheet 1

INVENTORS
GASTON L. DUPOUY, FRANTZ R. PERRIER & BERNARD MARATS

BY Abraham A. Saffitz
ATTORNEY

Sept. 28, 1965  G. L. DUPOUY ETAL  3,209,147
ELECTRON LENS SPHERICAL ABERRATION CORRECTING DEVICE
COMPRISING A CURRENT CARRYING WIRE
SECTION ON THE LENS AXIS
Filed March 5, 1963   3 Sheets-Sheet 2

INVENTORS
GASTON L. DUPOUY, FRANTZ R. PERRIER & BERNARD MARAIS
BY
Abraham A. Saffitz
ATTORNEY

United States Patent Office 3,209,147
Patented Sept. 28, 1965

3,209,147
ELECTRON LENS SPHERICAL ABERRATION CORRECTING DEVICE COMPRISING A CURRENT CARRYING WIRE SECTION ON THE LENS AXIS
Gaston L. Dupouy, Frantz R. Perrier, and Bernard Marais, Toulouse, France, assignors to Centre National de la Recherche Scientifique, Paris, France, a corporation of France
Filed Mar. 5, 1963, Ser. No. 263,057
2 Claims. (Cl. 250—49.5)

Our invention relates to electron optical systems and more particularly to new and improved means for correcting the spherical aberration encountered in electron lenses.

It is well known that the spherical aberration of electron lenses of the conventional type, whether electrostatic or magnetic, is always positive (i.e. marginal rays in an image point are refracted proportionately more than paraxial rays), and hence cannot be corrected by any combination of such lenses.

More precisely, an object point being imaged by paraxial rays in an image point, for rays which form initially larger angles $\alpha$ with the axis, the image point shifts progressively nearer to the object point. In other words, the lens strength increases monotonously with increasingly initial angle $\alpha$. For small angles, the law is approximately $$\frac{1}{f_\alpha} = \frac{1}{f}\left[1 + \frac{C_s}{f}\alpha^2\right]$$

where $f$ is the paraxial focal length, $f_\alpha$ the focal length corresponding to the angle $\alpha$ and $C_s$ is the coefficient usually called the spherical aberration magnitude. The ratio $C_s/f$ is quoted, with respect to a paramater respectively derived from the structural dimensions of magnetic or electrostatic lenses, in FIGS. 1.9 and 1.15 of a work entitled "The Electron Microscope," by M. E. Haine and V. E. Cosslett, published by E. F. N. Spon, Ltd., 22 Henrietta St., London, England. Practical minimal values for this ratio are given in said work. The minimum value of $C_s/f$ is about 0.4 for magnetic lenses and about ten times greater for electrostatic lenses.

There have been a number of methods described for the correction of spherical aberration. A method was suggested making use of an axial equipotential electrode in typical Einzel lenses. This electrode was a conducting wire connected to the outer apertured electrodes of the lens. This arrangement is not directly applicable to magnetic lenses without inserting in the axial hole of the lens at least two annular electrodes having the first a negative, the second a positive potential relative to the wire. The advantages of this arrangement in electrostatic lenses is discussed at page 63 of the abovementioned textbook and is found not to offer great hope of practical realisation. First, the wire is supported inside the lens, i.e. between the outer annular electrodes since it acts for varying the electrical field and consequently electrostatic lenses embodying the correcting device had to be designed with particular provisions. Then, at minimal spherical aberration, the focal plane of a conventional electrostatic lens is inside the lense field and, in this region, therefore, the lens cannot be used as an objective. It results that in the case of electrostatic lenses used as objectives the correcting device has to act upon a lens being in a region of significant spherical aberration, more difficult to correct in this region than in the minimum region.

The object of our invention is to provide a spherical aberration correcting device for electron lenses having control means for its deflecting effect and which may be secured to any pre-existing lens.

A correcting device in accordance with our invention includes a straight cylindrical wire, a rotationally symmetrical member axially supporting said wire and having means for being coaxially secured to an electron lens and means for applying a controllable direct current across said wire.

The feature of our invention which we believe to be novel are set forth with particularity in the appended claims. Our invention, both as to its organization and method of operation, together with further objects and advantages thereof, may be best understood by reference to the following description taken in connection with the accompanying drawings in which:

FIG. 1 recalls the deflecting effect of the magnetic field produced by a current in a wire upon electron trajectories;

Figure 5:
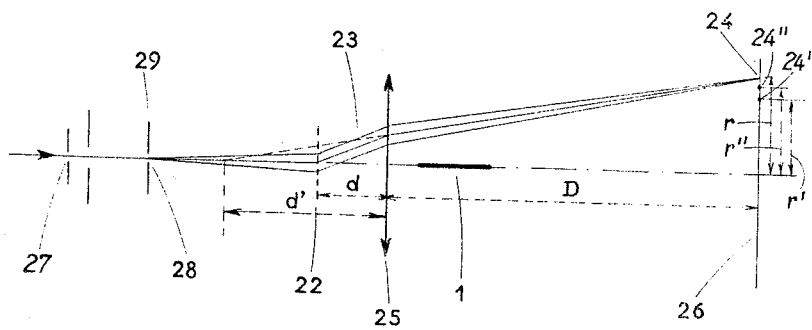
Figure 6:
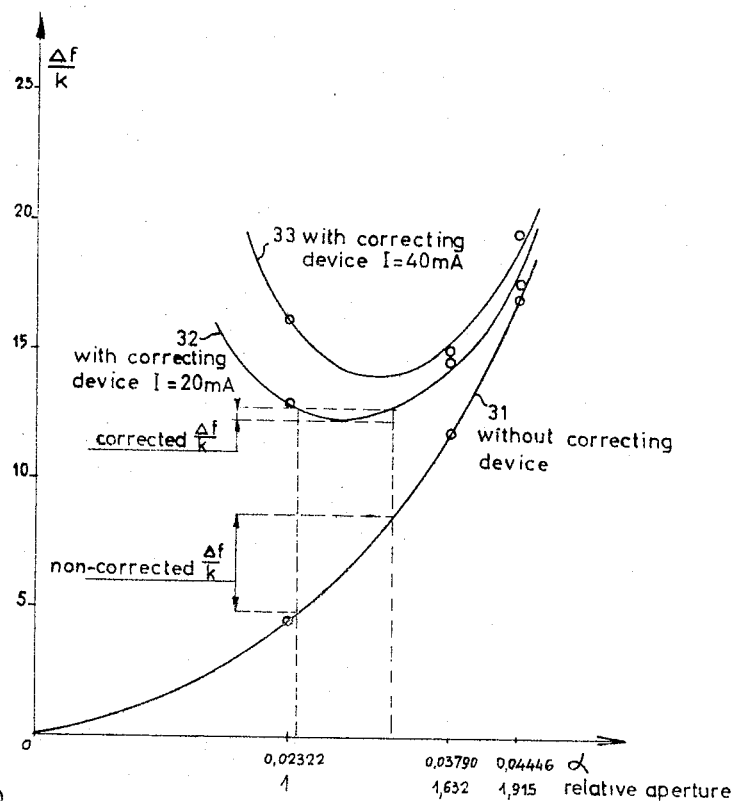
Figure 4B:
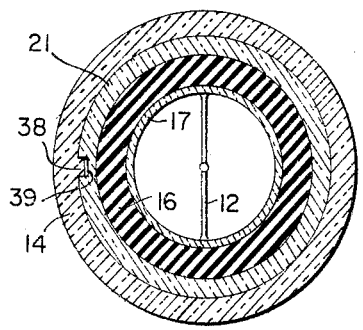

FIG. 5 represents an electron microscope giving a Debye and Scherrer diffraction powder pattern for measuring the spherical aberration correction; and FIG. 6 is a graph showing the longitudinal aberration equal to the product of the spherical aberration magnitude by the square of the angle of an incident ray with the axis in the object plane respectively without and with a correction device according to the invention.

Figure 1:
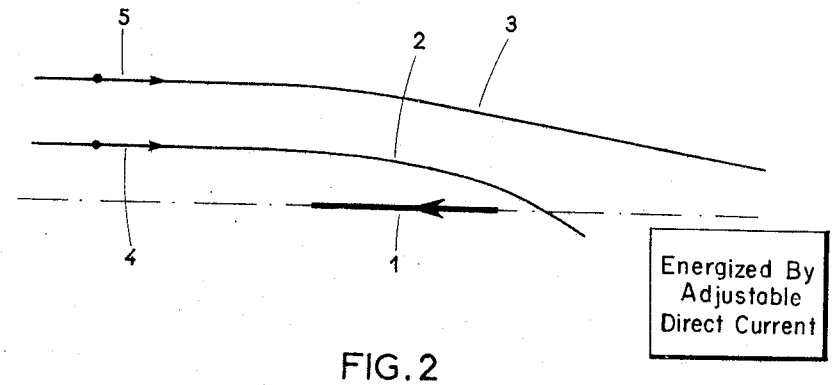

Referring now to FIG. 1, 1 is a conducting straight wire in which flows a direct current in the direction of the arrow, the intensity of which may be controlled. The current produces at a given point a steady magnetic field H in the space surrounding the wire, said field being perpendicular to the wire element and having a strength proportional to $1/r$, where $r$ is the distance from said point to wire 1. If electrons follow trajectories 2 and 3 with a velocity $v$ represented by arrows 4 and 5, they are subject to a radial accelerating force Hev (e, electron charge) which is the greater in proportion as the electrons are nearer the conducting wire. It results that the deflecting effect impressed by the magnetic field on the electrons is greater in proportion as the electrons traverse the lens closer to the axis. The action upon the electrons is not by itself a focalizing action as a lens proper must have a deflecting effect proportional to $r$ but it is an action opposite to the spherical aberration since it deflects the paraxial electrons more than the marginal ones whereas spherical aberration is due to greater deflection of the marginal electrons than the paraxial ones. Due to the non-focalizing properties of the system, it is to be used not by itself but in combination with a magnetic electron lens.

Figure 2:
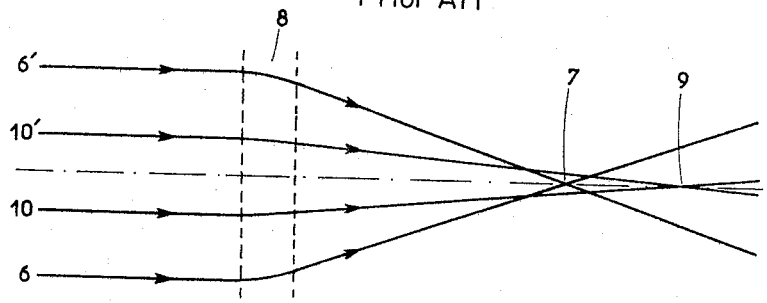
FIGS. 2 and 3 illustrate the phenomenon of spherical aberration as produced by electron lenses of the conventional type.

As already said the spherical aberration of any conventional electron lens results in the fact that the electrons traversing the lens far from the axis are refracted proportionately more than those close to the axis. This is represented in FIG. 2 where the electrons respectively following trajectories 6 and 6' cross the axis of lens 8 at point 7 and the electrons respectively following trajectories 10 and 10' cross the axis at point 9, which is father from lens 8 than point 7.

Figure 3:
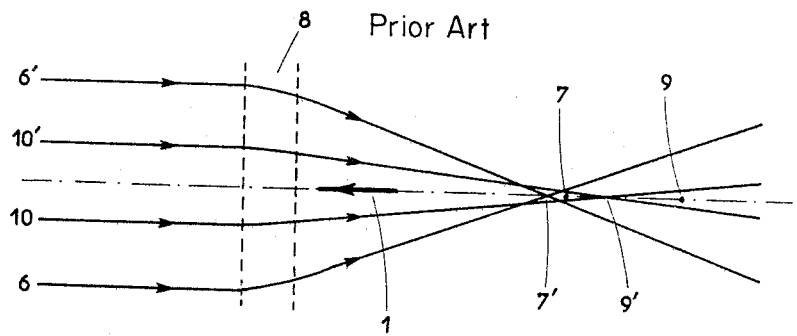

When a current opposite to the electron movement is applied to wire 1, the converging point for marginal electrons following trajectories 6 and 6' is 7' (FIG. 3) and the converging point for paraxial electrons following trajectories 10 and 10' is 9'. The longitudinal error 7–9 or 7'–9', which is called longitudinal spherical aberration and is equal to $\Delta f = f - f_a$ is smaller in FIG. 3 than in FIG. 2 and it may be brought to a very small value as will be explained in connection with FIGS. 5 and 6.

Figure 4A:
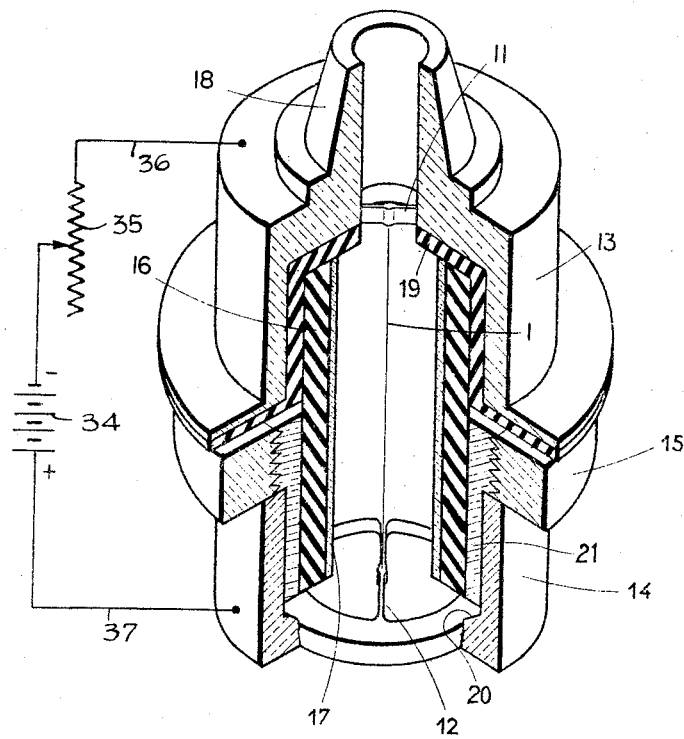
FIG. 4a and 4b are respectively a perspective view partially broken away and a transverse cross sectional view of the spherical aberration correcting device according to the invention.

FIG. 4a is a perspective, partially cross-sectional view of the correcting device. Wire 1 is supported by two narrow conducting bars respectively 11 and 12 diametrically secured within cylindrical conducting non-magnetic members 13 and 14, as of, for example, brass. Stepped diameter bores are provided within members 13 and 14 defining radial projecting ridges 19 and 20 and said members are slid over the ends of an insulating sleeve 16 and seated against the ridges. Member 14 is adapted to slideably receive therein a tuner support portion 21 one end of which is outwardly threaded. A ring 15, as of for example bronze, threadably engages the threads on the tuner support 21 for moving member 14 to and from member 13. Member 14 is captured against rotation by a shoulder 38 in part 14 and a longitudinal sliding groove 39. By turning ring 15 the spacing between members 13 and 14 can be controlled. This control is necessary since the wire 1 expands in response to the direct current flowing therethrough and thus begins to sag and to no longer coincide with the axis of the lens system. By slightly increasing, by means of turning ring 15, the spacing between members 13 and 14, the wire 1 is again straightened along said axis in part 21.

Member 13 is electrically connected to the magnetic lens assembly and is at the same potential as said assembly and member 14 is brought to a potential positive with respect to member 13 in order that a current flow in wire 1 in the opposite direction of the electron beam. This current is produced by a current source 34 and is applied to wire 1 via variable resistor 35 and leads 36 and 37, respectively, connected to members 13 and 14. Insulating sleeve 16 is internally metallized as for example by the brass sleeve 17.

Centering of the correcting device with its axial wire with respect to the magnetic lens with which it is associated is obtained by means of the conical hollow portion 18 which is inserted in a corresponding conical bore in the pole piece of the magnetic lens.

FIG. 5 shows an electron microscope mounted so as to obtain a Debye and Scherrer powder diffraction pattern from a thin film specimen coated with a layer of magnesium oxide. Electrons issue from an electron gun 27 and pass through a central aperture 28 in a diaphragm 29 and through the dry powder thin film specimen 22 where they are diffracted in several directions according to the well known Bragg's angles. The diffracted rays pass through a magnetic electron lens idealized at 25 and through the spherical aberration correcting device idealized at 1; diffraction rings are recorded photographically by allowing the electrons to fall directly on a photographic plate 26.

Let 24, 24' and 24" be the diffraction ring of order $n$ respectively in the absence of spherical aberration, in the presence of non-corrected spherical aberration and in the presence of corrected spherical aberration and $R_n$, $R'_n$, $R''_n$ be the respective corresponding radii. Let $d$ be the distance between the specimen and the lens, $D$ the distance between the photographic plate and the lens and $d'$ the distance of the image of the specimen center to the lens.

The rings 24' and 24" can be photographed but the theoretical ring 24 cannot be. Let us introduce the relative radii of the diffraction rings equal to the ratio of the radius of the rings of every order to the radius of the ring or order one, that is:

$$r_n = \frac{R_n}{R_1} \quad r'_n = \frac{R'_n}{R'_1} \quad r''_n = \frac{R''_n}{R''_1} \quad (1)$$

that amounts to saying that the radius $R_1$ of the theoretical diffraction ring of order one is taken as unit for measuring the radii of the other theoretical rings, the radius $R'_1$ of the non-corrected diffraction ring of order one as unit for measuring the radii of the other non-corrected rings and the radius $R''_1$ of the corrected diffraction ring of order one as unit for measuring the radii of the other corrected ring.

If $(dR_n)'$ and $(dR_n)''$ are respectively the difference between the radii of the actual ring and of the corrected actual ring of order $n$ and the radius of the theoretical ring and $(dr_n)'$ and $(dr_n)''$ the corresponding quantities relating to the relative radii:

$$(dR_n)' = R_n - R'_n$$
$$(dR_n)'' = R_n - R''_n$$
$$(dr_n)' = r_n - r'_n$$
$$(dr_n)'' = r_n - r''_n$$

one may write, considering that $(dR_n)'$ is proportional to $R^3_n$ (see Principles of Optics by Max Born and Emil Wolf, Pergamon Press, New York, 1959, page 212).

$$(dR_n)' = \frac{R_1(dr_n)'}{1 - \frac{1}{r^2_n}} \approx \frac{R'_n(dr_n)'}{1 - \frac{1}{r^2_n}}$$

and $$(dR_1)' = \frac{R_1(dr_n)'}{r^3_n\left(1 - \frac{1}{r^2_n}\right)} \approx \frac{R'_1(dr_n)'}{r^3_n\left(1 - \frac{1}{r^2_n}\right)} \quad (2)$$

Referring to FIG. 5, the focal length $f$ of lens 25 is related to the distances $d$ and $d'$ by:

$$\frac{1}{f} = \frac{1}{d} - \frac{1}{d'}$$

wherefrom may be derived by logarithmic differentiation:

$$\frac{\Delta f}{f} = \frac{f}{d'}\frac{\Delta d'}{d'} \quad (3)$$

From geometrical considerations of FIG. 5, one may write $$\frac{(dR_n)'}{D} = \frac{R_n}{D+d'}\frac{\Delta d'}{d'} \quad (4)$$

and by combining Equations 3 and 4

$$\Delta f = \frac{f^2}{d'}\frac{D+d'}{D}\frac{(dR_n)'}{R_n}$$

or $$\Delta f = K\frac{(dR_n)'}{R_n} \quad (5)$$

wherein $$K = \frac{f^2}{d'}\frac{D+d'}{D}$$

By replacing in Equation 5

$$\frac{(dR_n)'}{R_n}$$

by its value derived from Expression 1, Equation 5 becomes:

$$\left(\frac{\Delta f}{K}\right)_{\text{non-corrected}} = \frac{(dr_n)'}{r_n} + \frac{(dR_1)'}{R'_1} \quad (6)$$

and by replacing in Equation 6 $(dR_1)'$ by its value 2, it becomes $$\left(\frac{\Delta f}{K}\right)_{\text{non-corrected}} = \frac{(dr_n)'}{r_n} + \frac{(dr_n)'}{r^3_n - r_n} \quad (7)$$

The corresponding expression for $$\left(\frac{\Delta f}{K}\right)_{\text{corrected}}$$

is immediately derived by replacing $(dr_n)'$ by $(dr_n)''$ and $(dR_1)'$ by $(dR_1)'' = (dR_1)' + R''_1 - R'_1$ which gives:

$$\left(\frac{\Delta f}{K}\right)_{\text{corrected}} = \frac{(dr_n)''}{r_n} + \frac{(dr_n)'}{r^3_n - r_n} + \frac{R''_1 - R'_1}{R''_1} \quad (8)$$

Experimental values are given hereunder for a correcting current of 20 ma.

$$\left(\text{in the table } k = \frac{K}{1000}\right)$$

| Apperture in radians | r | r' | r'' | Δf/k non-corrected | Δf/k corrected |
|---|---|---|---|---|---|
| 0.02322 | 1 | 1 | 1 | 4.6 | 13 |
| 0.03790 | 1.632 | 1.620 | 1.629 | 12 | 14.8 |
| 0.04446 | 1.915 | 1.891 | 1.906 | 17.1 | 17.7 |

FIG. 6 shows a curve 31 giving $$\left(\frac{\Delta f}{k}\right)_{\text{non-corrected}}$$

a curve giving 32

$$\left(\frac{\Delta f}{k}\right)_{\text{corrected}}$$

for $I=20_{\text{ma}}$ and a curve 33 giving $$\left(\frac{\Delta f}{k}\right)_{\text{corrected}}$$

for $I=40$ ma. It results from the appearance of curves 32 and 33 that between two apertures on both sides of the minima of the curves the longitudinal spherical aberration is significantly decreased by the correcting device. The relative longitudinal aberration $$\left(\frac{\Delta f}{k}\right)_{\text{corrected}} \bigg/ \left(\frac{\Delta f}{k}\right)_{\text{non-corrected}}$$

may be easily brought into a range of from 0.1 to 0.35.

Of course the correcting device of the invention may be used either to decrease the spherical aberration with constant aperture or to increase the aperture with constant aberration when the latter is not objectionable.

What we claim is:

1. A spherical aberration correcting device for an electron lens system which is associated with an electron gun from which electrons issue in a beam along a central axis which is the same as the lens system axis, comprising support means for coaxially securing said device to a magnetic lens element of said electron lens system at the side of said magnetic lens which is opposite to said electron gun, two conducting hollow members coaxially mounted on said support means in slideable mounting relation to each other, a conducting wire section coaxially supported by said conducting hollow members in alignment with the central axis of the lens system and energizing means for applying from said members to said wire section an adjustable direct current in the direction opposite to the electron displacement, whereby the electrons issued from said electron gun undergo a radially attractive force due to the magnetic field produced by said direct current in said wire section, said force being greater in the proportion as the electrons are nearer the wire section, and the distance between the conducting hollow members can be adjusted to maintain the wire section aligned with said central axis regardless of the wire section expansion due to the current flowing therethrough.

2. A spherical aberration correcting device for an electron lens system which is associated with an electron gun from which electrons issue in a beam along a central axis which is the same as the lens system axis, comprising support means for coaxially securing said device to a magnetic lens element of said electron lens system at the side of said magnetic lens which is opposite to said electron gun, an insulating sleeve, two conducting hollow members slideably fitted on said sleeve, a conducting wire section coaxially supported by said conducting hollow members in alignment with the central axis of the lens system, energizing means for applying from said members to said wire section an adjustable direct current in the direction opposite to the electron displacement and means for adjusting the spacing of said conducting hollow members along said insulating sleeve, whereby the electrons issued from said electron gun undergo a radially attractive force due to the magnetic field produced by said direct current in said wire section, said force being greater in the proportion as the electrons are nearer the wire section, and the adjusting means can maintain the wire section aligned with said central axis regardless of the wire section expansion due to the current flowing therethrough.

References Cited by the Examiner

UNITED STATES PATENTS 2,452,119  11/48  Gabor _____ 313—84

RALPH G. NILSON, *Primary Examiner.*